US006912348B2

(12) United States Patent
Sillard et al.

(10) Patent No.: US 6,912,348 B2
(45) Date of Patent: Jun. 28, 2005

(54) DISPERSION-COMPENSATING FIBER USING A HIGHER-ORDER MODE

(75) Inventors: Pierre Sillard, Le Chesnay (FR); Lionel Expert, Paris (FR); Pascale Nouchi, Maisons-Lafitte (FR)

(73) Assignee: Alcatel, Paris (FR)

( * ) Notice: Subject to any disclaimer, the term of this patent is extended or adjusted under 35 U.S.C. 154(b) by 128 days.

(21) Appl. No.: 10/289,439

(22) Filed: Nov. 7, 2002

(65) Prior Publication Data

US 2003/0190127 A1 Oct. 9, 2003

(30) Foreign Application Priority Data

Apr. 5, 2002 (FR) .............................. 02 04271

(51) Int. Cl.[7] .............................................. G02B 6/16
(52) U.S. Cl. ........................ 385/123; 385/127; 385/28; 385/161
(58) Field of Search ................................ 385/123, 127, 385/23–29, 161; 359/161

(56) References Cited

U.S. PATENT DOCUMENTS

| | | | |
|---|---|---|---|
| 5,802,234 A | | 9/1998 | Vengsarkar et al. |
| 6,339,665 B1 | * | 1/2002 | Danziger .................... 385/123 |
| 6,751,390 B2 | * | 6/2004 | Qi et al. ..................... 385/127 |
| 2002/0012510 A1 | | 1/2002 | Jiang et al. |
| 2003/0185531 A1 | * | 10/2003 | Lysiansky et al. .......... 385/127 |

OTHER PUBLICATIONS

A. Goel et al, "Wide–Band Dispersion Compensating Optical Fiber", IEEE Photonics Technology Letters, IEEE, Inc., NY, vol., 8, No. 12, Dec. 1, 1996, pp. 1668–1670, XP000679544.

A. H. Gnauck et al, "Dispersion and dispersion–slope compensation of NZDSF over the entire C band using higher–order–mode fibre", Electronics Letters, IEE Stevenage, GB, vol. 36, No. 23, Nov. 9, 2000, pp. 1946–1947, XP006015890.

M. Eguchi et al, "Dispersion Compensation Based on Dual–Mode Optical Fibre With Inhomogeneous Profile Core", Journal of Lightwave Technology, IEEE, NY, US, vol. 14, No. 10 Oct. 1, 1996, pp. 2387–2394, XP000631544.

* cited by examiner

*Primary Examiner*—John R. Lee
*Assistant Examiner*—Zia R. Hashmi
(74) *Attorney, Agent, or Firm*—Sughrue Mion, PLLC

(57) ABSTRACT

The invention relates to a dispersion-compensating optical fiber for use in wavelength division multiplex transmission systems, said fiber including successively, from the center toward the periphery, a core having a varying index profile and then a cladding having a constant index, enabling the propagation, for a given operating spectral range greater than 30 nm, of at least one higher-order mode in addition to the $LP_{01}$ fundamental mode, the index profile of the core being determined so that, for said higher mode, and for said operating spectral range, the chromatic dispersion is less than −150 ps/nm.km, the chromatic dispersion slope is negative, the effective area is greater than 40 $\mu m^2$, the difference between the wavelength corresponding to the overall minimum chromatic dispersion outside the operating spectral range and the wavelength corresponding to the upper limit of the operating spectral range is greater than 35 nm, and the relative variation of the dispersion slope over the operating spectral range has an absolute value less than 30%.

27 Claims, 7 Drawing Sheets

| | Type | r1 (μm) | r2 (μm) | r3 (μm) | r4 (μm) | r5 (μm) | r6 (μm) | $10^3\Delta n1$ | $10^3\Delta n2$ | $10^3\Delta n3$ | $10^3\Delta n4$ | $10^3\Delta n5$ | $10^3\Delta n6$ |
|---|---|---|---|---|---|---|---|---|---|---|---|---|---|
| 1 | 5 Tranches | 3.72 | 5.22 | 8.21 | 13.28 | 14.92 | | 30.0 | -3.3 | 4.1 | -2.1 | 7.0 | |
| 2 | 5 Tranches | 3.59 | 5.43 | 8.54 | 12.42 | 15.53 | | 32.0 | -3.1 | 4.3 | -3.9 | 4.0 | |
| 3 | 6 Tranches | 3.43 | 4.91 | 8.01 | 9.04 | 11.30 | 15.97 | 32.0 | -5.0 | 4.1 | -0.9 | -7.0 | 3.4 |
| 4 | 4 Tranches | 3.60 | 6.47 | 9.80 | 14.00 | | | 30.0 | 3.3 | 0.0 | 0.7 | | |
| 5 | 5 Tranches | 3.69 | 6.22 | 8.28 | 12.05 | 15.06 | | 30.0 | -0.9 | 6.1 | -4.0 | 4.2 | |
| 6 | 5 Tranches | 3.63 | 5.15 | 8.09 | 11.76 | 14.70 | | 32 | -4.3 | 4.8 | -3.7 | 4.3 | |
| 7 | 4 Tranches | 3.61 | 11.20 | 14.40 | 16.00 | | | 30.0 | 1.4 | -2.3 | 6.4 | | |
| 8 | 5 Tranches | 3.98 | 5.40 | 8.48 | 11.67 | 15.42 | | 28.3 | -7.0 | 4.7 | -3.4 | 3.3 | |
| 9 | 3 Tranches | 3.96 | 5.50 | 12.22 | | | | 27.0 | 1.0 | 1.2 | | | |
| 10 | 3 Tranches | 3.60 | 6.40 | 16.00 | | | | 30.0 | 1.1 | 0.7 | | | |
| 11 | 4 Tranches | 3.63 | 8.30 | 9.53 | 13.61 | | | 30.0 | 1.4 | -1.1 | 1.4 | | |
| 12 | 4 Tranches | 3.65 | 10.56 | 13.15 | 16.00 | | | 30.0 | 1.2 | 2.6 | 2.4 | | |
| 13 | 4 Tranches | 3.84 | 6.4 | 11.2 | 16 | | | 28.7 | 0.6 | 1.6 | 1.5 | | |
| 14 | 4 Tranches | 4.53 | 6.41 | 8.18 | 11.68 | | | 24.8 | -3.7 | -2.0 | 6.4 | | |

FIG_1

| | Type | S_eff μm² | Dispersion ps/nm·km | Pente ps/nm²·km | | | | | | | λmin nm | Variation maximale de Pente % | | |
|---|---|---|---|---|---|---|---|---|---|---|---|---|---|---|
| | | 1550nm | 1550nm | 1530 | 1550 | 1565 | 1570 | 1580 | 1590 | 1605 | | 1530-1565 | 1530-1580 | 1530-1605 |
| 1 | 5T | 85 | -350 | -1.12 | -1.04 | -1.04 | -1.05 | -1.08 | -1.08 | -0.91 | 1625 | 8 | 8 | 20 |
| 2 | 5T | 80 | -415 | -1.44 | -1.22 | -1.18 | -1.20 | -1.28 | -1.35 | -1.26 | 1625 | 21 | 21 | 22 |
| 3 | 6T | 75 | -415 | -1.49 | -1.22 | -1.13 | -1.15 | -1.27 | -1.50 | -1.86 | 1635 | 29 | 29 | - |
| 4 | 4T | 70 | -210 | -0.68 | -0.70 | -0.70 | -0.70 | -0.68 | -0.66 | -0.60 | 1660 | 3 | 3 | 14 |
| 5 | 5T | 85 | -350 | -1.21 | -1.14 | -1.14 | -1.15 | -1.17 | -1.16 | -0.95 | 1625 | 6 | 6 | 23 |
| 6 | 5T | 75 | -365 | -1.30 | -1.19 | -1.17 | -1.18 | -1.22 | -1.27 | -1.26 | 1635 | 11 | 11 | 11 |
| 7 | 4T | 80 | -340 | -1.76 | -1.88 | -1.96 | -1.97 | -1.98 | -1.90 | -1.48 | 1625 | 11 | 12 | 25 |
| 8 | 5T | 75 | -340 | -1.86 | -1.90 | -1.93 | -1.93 | -1.91 | -1.82 | -1.42 | 1625 | 4 | 4 | 26 |
| 9 | 3T | 65 | -210 | -1.30 | -1.42 | -1.47 | -1.48 | -1.47 | -1.42 | -1.27 | 1660 | 12 | 13 | 14 |
| 10 | 3T | 75 | -350 | -2.20 | -2.39 | -2.38 | -2.32 | -2.09 | -1.72 | -0.77 | 1615 | 8 | 13 | - |
| 11 | 4T | 70 | -310 | -1.85 | -2.05 | -2.12 | -2.12 | -2.05 | -1.87 | -1.34 | 1630 | 13 | 13 | 37 |
| 12 | 4T | 75 | -360 | -2.49 | -2.90 | -3.06 | -3.06 | -2.89 | -2.44 | -1.10 | 1615 | 20 | 20 | - |
| 13 | 4T | 65 | -300 | -2.52 | -2.91 | -3.19 | -3.23 | -3.22 | -2.98 | -2.10 | 1625 | 23 | 24 | 35 |
| 14 | 4T | 60 | -315 | -4.92 | -6.38 | -7.18 | -7.19 | -6.47 | -4.58 | - | 1605 | 35 | 36 | - |

FIG-2

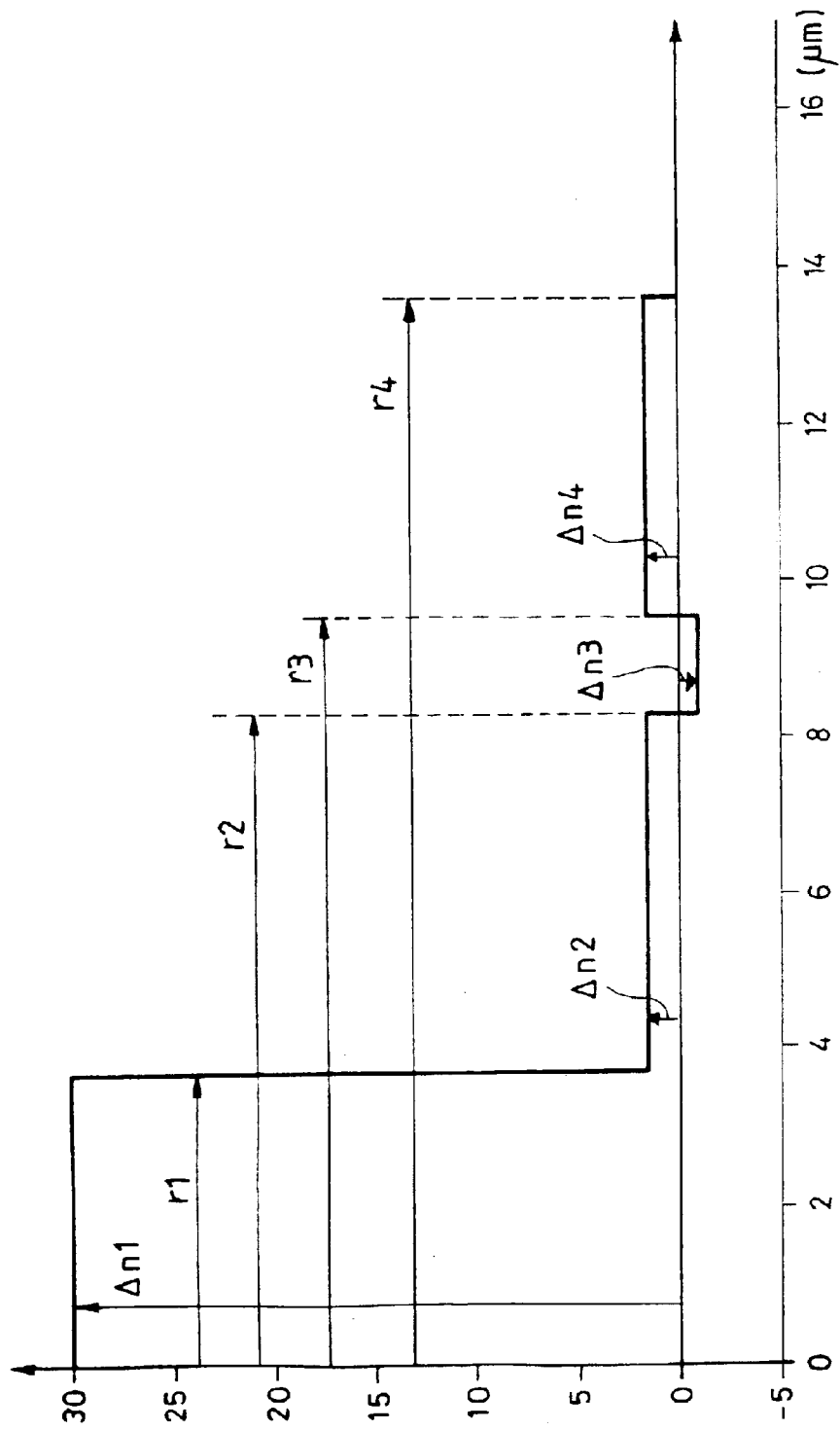
FIG_3

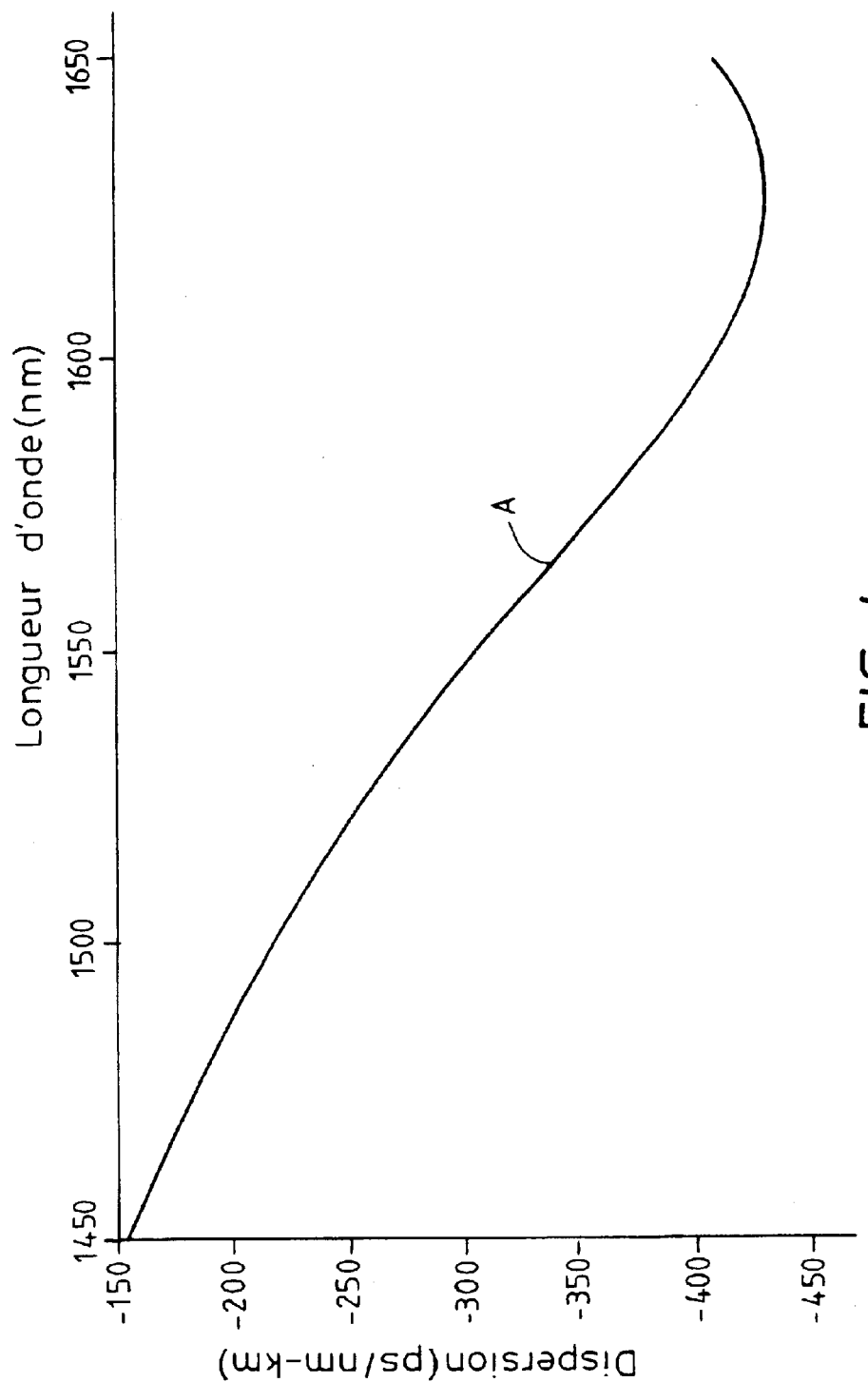
FIG_4

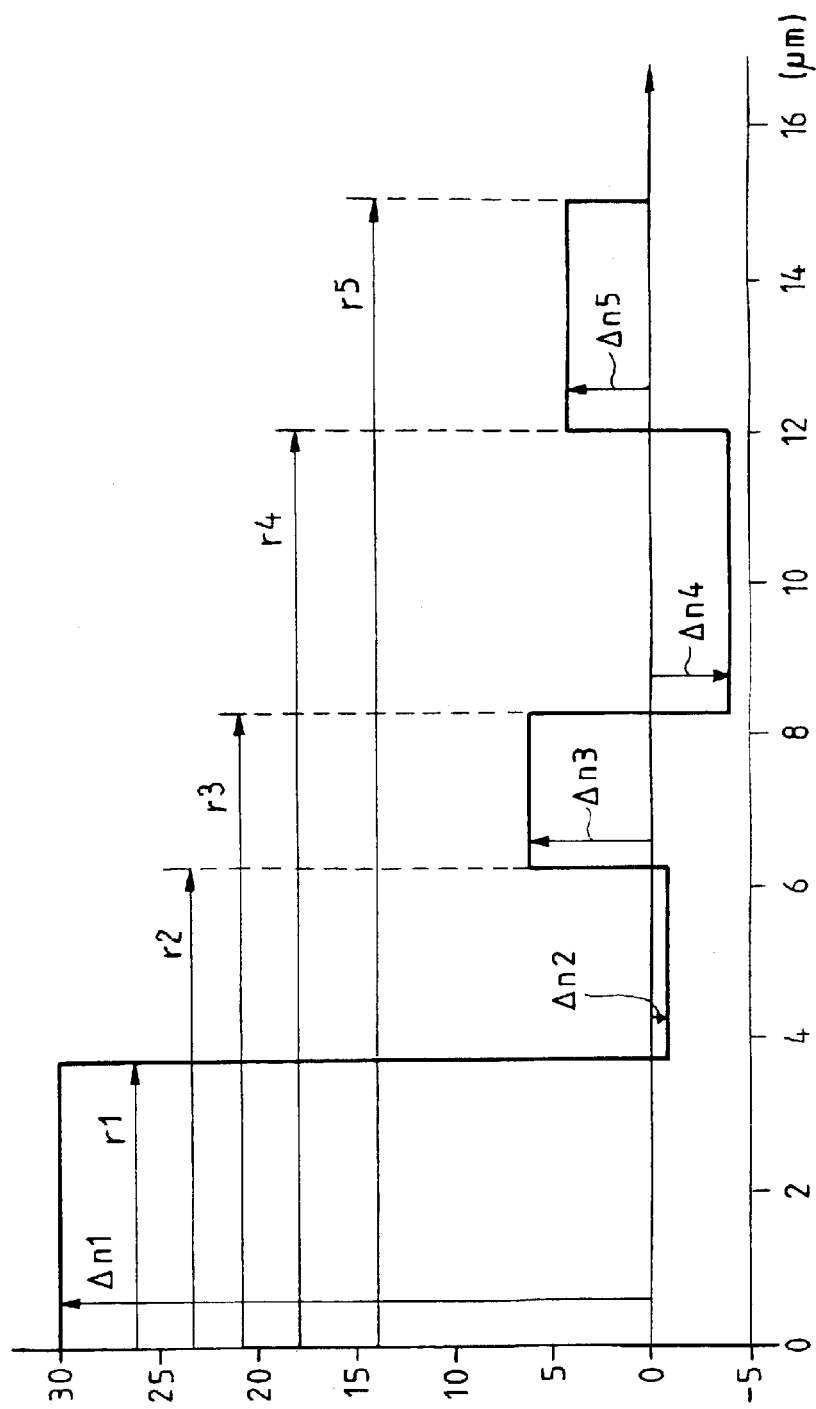
FIG_5

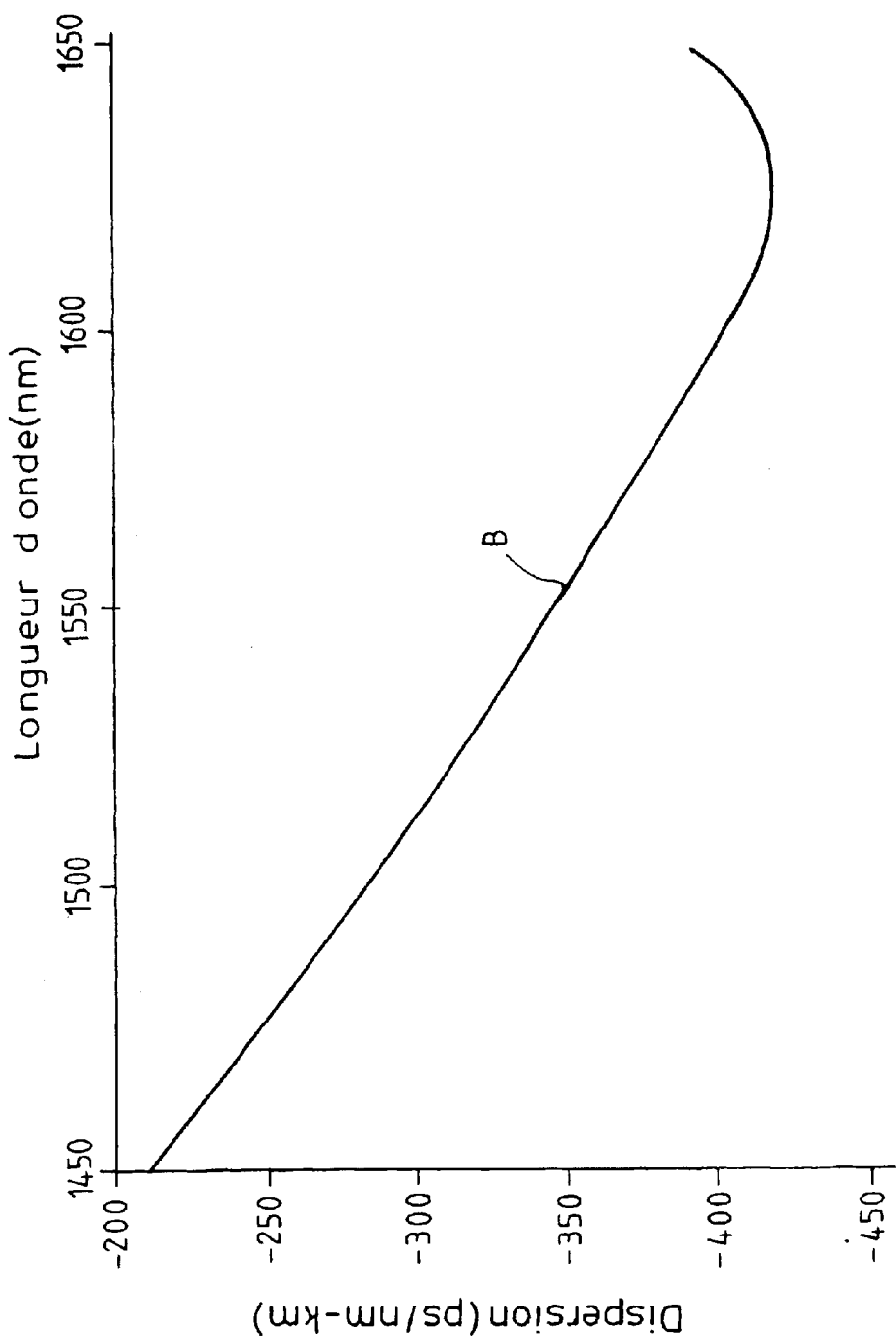
FIG_6

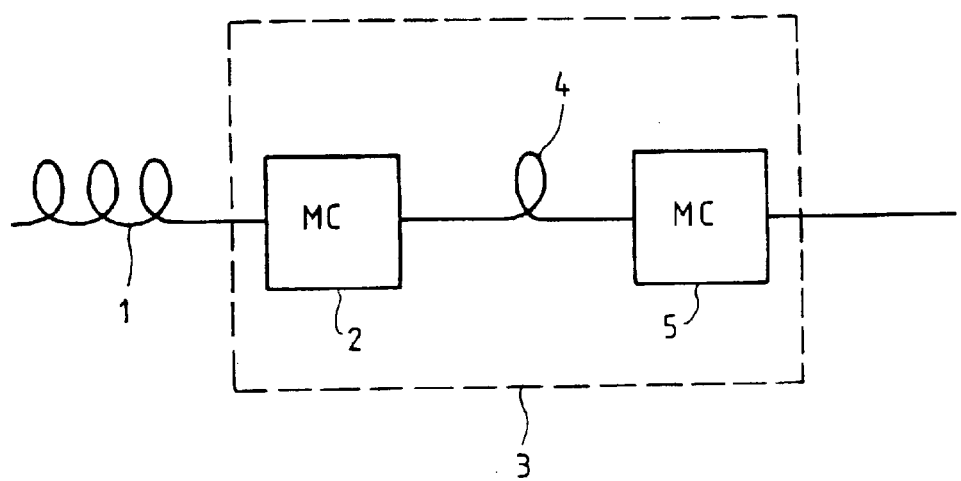
FIG_7

DISPERSION-COMPENSATING FIBER USING A HIGHER-ORDER MODE

The field of the invention is that of dispersion-compensating optical fibers for use in wavelength division multiplex transmission systems. The function of the dispersion-compensating optical fiber is to compensate the chromatic dispersion of a line fiber.

It is known in the art to associate non-zero dispersion-shifted fibers (NZ-DSF) for reducing crossed non-linear effects and dispersion-compensating fibers (DCF) to obtain a transmission line with zero dispersion over a wide spectral range. A drawback of associating dispersion-shifted fibers and conventional dispersion-compensating fibers in this way is the high losses of the dispersion-compensating fiber, especially bending losses and attenuation per unit length.

It is also known in the art to use a dispersion-managed fiber (DMF) comprising optical fiber portions having positive chromatic dispersion alternating longitudinally with optical fiber portions having negative chromatic dispersion. The chromatic dispersion for the whole of the dispersion-managed optical fiber is therefore easily compensated for a given wavelength. However, if the spectral range over which the dispersion-managed optical fiber is used is increased, chromatic dispersion must be compensated over a wide spectral range, i.e. the chromatic dispersion slope must also be compensated. In practice, chromatic dispersion slope is much more difficult to compensate and is often accompanied by deterioration of other parameters of the dispersion-managed optical fiber, in particular its effective area. Moreover, the dispersion-managed optical fiber must replace not only the line optical fiber but also the associated dispersion-compensating optical fiber, and cannot simply be associated with an existing line optical fiber.

It is further known in the art to use higher-order mode (HOM) dispersion-compensating optical fiber, which has a number of benefits, including a significantly larger effective area than conventional dispersion-compensating optical fibers, and necessitates shorter lengths than conventional dispersion-compensating optical fibers to compensate a given line optical fiber, because of very low negative values of chromatic dispersion for equivalent attenuation per unit length.

Nevertheless, the invention is based on the observation that the chromatic dispersion curves obtained with a minimum chromatic dispersion wavelength in or in the vicinity of the operating spectral range, are of a shape that prevents correct compensation of chromatic dispersion slope of the transmission system, and this becomes unacceptable if the bit rate is significantly increased. The minimum chromatic dispersion wavelength is the wavelength corresponding to the minimum overall chromatic dispersion.

The solution proposed by the invention is based on obtaining chromatic dispersion curves for which the minimum chromatic dispersion wavelength is far away from the operating spectral range, which makes it possible to obtain a chromatic dispersion curve that is almost a straight line in the operating spectral range concerned, which is effective in compensating the chromatic dispersion of the line optical fiber, and which has chromatic dispersion slope that is practically constant, even when a high bit rate is used.

The invention provides a dispersion-compensating optical fiber for use in wavelength division multiplex transmission systems, said fiber comprising, successively, from its center towards its periphery, a core having a varying index profile and then cladding having constant index, making it possible, for a given operating spectral range greater than 30 nanometers (nm), for one or more higher-order modes to propagate in addition to the fundamental mode $LP_{01}$, the index profile of the core being determined so that, for the higher mode, and for the operating spectral range, firstly, its chromatic dispersion is less than −150 picoseconds per nanometer-kilometer (ps/nm.km), secondly, its chromatic dispersion slope is negative, thirdly, its effective area is greater than 40 square micrometers ($\mu m^2$), fourthly, the difference between the wavelength corresponding to the overall minimum chromatic dispersion outside the operating spectral range and the wavelength corresponding to the upper limit of the operating spectral range is greater than 35 nm, and, fifthly, the relative variation of the dispersion slope over the operating spectral range, i.e. the quotient obtained by taking the difference between the maximum chromatic dispersion slope over the operating spectral range and the minimum chromatic dispersion slope over the operating spectral range and dividing that difference by the average chromatic dispersion slope over the operating spectral range, has an absolute value less than 30%.

To improve the quality of chromatic dispersion compensation, even when high bit rates are used, typically 10 Gbit/s and above, the index profile of the core is preferably determined so that, for said higher mode, and for said operating spectral range, the difference between the wavelength corresponding to the overall minimum chromatic dispersion out of the operating spectral range and the wavelength corresponding to the upper limit of the operating spectral range is greater than 50 nm, and the index profile of the core is determined so that, for said higher mode, and for said operating spectral range, the relative variation of the dispersion slope over the operating spectral range has an absolute value of less than 15%. Moreover, the fact that the operating spectral range is at least 50 nm away from the minimum chromatic dispersion wavelength reduces the constraints applying to the core index profiles for the profiles to have an absolute value of the relative variation of the dispersion slope over the operating spectral range less than 15%.

The index profile of the core is preferably determined so that, for said higher mode, and for said operating spectral range, the chromatic dispersion is less than −300 ps/nm.km, which reduces the length of compensating optical fiber to be used for a given line optical fiber.

The higher-order mode is preferably the $LP_{02}$ mode, for which dispersion-compensating optical fibers having very negative chromatic dispersions can be easily obtained, and which is relatively insensitive to circular geometry defects of the fiber, which cause polarization problems. Other higher-order modes can be envisaged, however, for example the $LP_{11}$ mode or the $LP_{03}$ mode.

One preferred operating spectral range is the C band from 1530 nm to 1565 nm. A wavelength multiplex division optical fiber transmission system described in more detail hereinafter incorporating an HOM dispersion-compensating optical fiber according to the invention preferably has an absolute value of the average cumulative chromatic dispersion for each wavelength from 1530 nm to 1565 nm less than 30 picoseconds per nanometer (ps/nm) for a transmission distance of 100 kilometers (km). Another preferred spectral band is the extended C band from 1530 nm to 1580 nm. A wavelength division multiplex optical fiber transmission system described in more detail hereinafter incorporating an HOM dispersion-compensating optical fiber according to the invention preferably has an absolute value of the average cumulative chromatic dispersion for each wavelength from 1530 nm to 1580 nm less than 50 ps/nm for a transmission distance of 100 km.

The index profile of the core preferably comprises at least four sections. The index profile of the core advantageously comprises at least five sections. The more negative the chromatic dispersion, the more beneficial is a high number of sections of the index profile of the core for obtaining good linearity of the curve of chromatic dispersion as a function of wavelength for the HOM dispersion-compensating optical fiber according to the invention. A high number of sections produces an HOM dispersion-compensating optical fiber which provides very good chromatic dispersion compensation but does not degrade too much other properties of the HOM dispersion-compensating optical fiber. For compensation over a spectral band or an extended spectral band, five sections represents a good compromise between the required properties of the HOM dispersion-compensating optical fiber and the complexity of fabricating it. The sections are rectangular, for example, but can also be triangular, trapezoidal or in the shape of the Greek letter alpha.

In a first preferred embodiment of the invention, the core of the HOM dispersion-compensating optical fiber according to the invention has a first type of varying index profile with four sections. The first type of varying index profile of the core successively comprises, from the center toward the periphery, a central section having a maximum index higher than the index of the cladding, a first peripheral section having a maximum index lower than the index of the central section, a second peripheral section having a maximum index lower than the index of the central section, and a third peripheral section having a maximum index lower than the index of the central section.

A number of preferred ranges for the indices and the radii of the first type of index profile of the core which improve the compensation quality and other properties of an HOM dispersion-compensating optical fiber according to the invention are defined next.

The absolute value of the maximum index difference $\Delta n1$ between the index of the central section and the index of the cladding is preferably from $20 \times 10^{-3}$ to $35 \times 10^{-3}$ and the outside radius r1 of the central section is preferably from 3 micrometers ($\mu$m) to 5 $\mu$m.

The absolute value of the maximum index difference $|\Delta n2|$ between the index of the first peripheral section and the index of the cladding preferably remains less than $5 \times 10^{-3}$ and the outside radius r2 of the first peripheral section is preferably from 6 $\mu$m to 11 $\mu$m. The expression "remains less than" means "is less than" if the parameter is constant or "remains less than" over the section concerned if the parameter varies over the section concerned.

The absolute value of the index difference $|\Delta n3|$ between the index of the second peripheral section and the index of the cladding preferably remains less than $5 \times 10^{-3}$ and the outside radius r3 of the second peripheral section is preferably from 8 $\mu$m to 15 $\mu$m.

The index difference $|\Delta n4|$ between the index of the third peripheral section and the index of the cladding preferably remains from 0 to $8 \times 10^{-3}$ and the outside radius r4 of the third peripheral section is preferably from 10 $\mu$m to 17 $\mu$m.

A second preferred embodiment of an HOM dispersion-compensating optical fiber according to the invention has a core with a second type of varying index profile with five sections. The second type of varying index profile of the core is successively made up of, from the center toward the periphery, a central section having a maximum index higher than the index of the cladding, a first buried section having a minimum index lower than the index of the cladding, a first annular section having a maximum index higher than the index of the cladding and lower than the maximum index of the central section, a second buried section having a minimum index lower than the index of the cladding, and a second annular section having a maximum index higher than the index of the cladding and lower than the maximum index of the central section.

A number of preferred ranges for the indices and the radii of the second type of index profile of the core which improve the compensation quality and other properties of an HOM dispersion-compensating optical fiber according to the invention are defined next.

The maximum index difference $\Delta n1$ between the index of the central section and the index of the cladding is preferably from $23 \times 10^{-3}$ to $35 \times 10^{-3}$ and the outside radius r1 of the central section is preferably from 3 $\mu$m to 4.5 $\mu$m.

The index difference $\Delta n2$ between the index of the first buried section and the index of the cladding preferably remains from $-8 \times 10^{-3}$ to 0 and the outside radius r2 of the first buried section is preferably from 4.5 $\mu$m to 7.5 $\mu$m. The expression "remains from" means "is from" if the parameter is constant or "remains from" over the section concerned if the parameter varies over the section concerned.

The index difference $\Delta n3$ between the index of the first annular section and the index of the cladding preferably remains from $2 \times 10^{-3}$ to $8 \times 10^{-3}$ and the outside radius r3 of the first annular section is preferably from 6 $\mu$m to 11 $\mu$m.

The index difference $\Delta n4$ between the index of the second buried section and the index of the cladding is preferably from $-8 \times 10^{-3}$ to 0 and the outside radius r4 of the second buried section is preferably from 10 $\mu$m to 15 $\mu$m.

The index difference $\Delta n5$ between the index of the second annular section and the index of the cladding preferably remains from 0 to $10 \times 10^{-3}$ and the outside radius r5 of the second annular section is preferably from 13 $\mu$m to 17 $\mu$m.

For an HOM dispersion-compensating optical fiber according to the invention to be of particular benefit where the loss balance is concerned, it preferably has an attenuation lower than 1.5 decibels per kilometer (dB/km) at a wavelength of 1550 nm.

The invention also provides a chromatic dispersion-compensating module incorporating an HOM dispersion-compensating optical fiber according to the invention. The module preferably comprises successively in series a first mode converter capable of converting the fundamental mode into the higher-order mode, a dispersion-compensating optical fiber according to the invention, and a second mode converter capable of converting the higher-order mode into the fundamental mode. The module can be integrated into a wavelength division multiplex optical fiber transmission system, which system then comprises successively in series a line optical fiber and a compensating module according to the invention. In a wavelength division multiplex optical fiber transmission system according to the invention, for optimum compensation, the ratio between the length of the line optical fiber and the length of the dispersion-compensating optical fiber is preferably substantially equal to the reciprocal of the absolute value of the ratio between the chromatic dispersion of the line optical fiber at a wavelength of 1550 nm and the chromatic dispersion of the dispersion-compensating optical fiber at a wavelength of 1550 nm.

The invention will be better understood and other features and advantages will become apparent in the course of the following description and from the accompanying drawings, which are provided by way of example, and in which:

FIG. 1 is a table of radius values and maximum index difference absolute values for fourteen examples of profiles of first, second and other types of HOM dispersion-compensating optical fiber according to the invention;

FIG. 2 is a table of other properties of the profiles of an HOM dispersion-compensating optical fiber according to the invention shown in FIG. 1 for the $LP_{02}$ mode;

FIG. 3 shows diagrammatically one example of a first type of profile with four sections of an HOM dispersion-compensating optical fiber according to the invention;

FIG. 4 shows diagrammatically the chromatic dispersion variations of the profile example shown in FIG. 3 over a wide spectral range;

FIG. 5 shows diagrammatically a second type of profile with five sections of an HOM dispersion-compensating optical fiber according to the invention;

FIG. 6 shows diagrammatically the chromatic dispersion variations of the profile example shown in FIG. 5 over a wide spectral range; and FIG. 7 shows diagrammatically a wavelength division multiplex optical fiber transmission system according to the invention.

FIG. 1 is a table of radius values and maximum index difference absolute values for fourteen examples of profiles of first, second and other types of HOM dispersion-compensating optical fiber according to the invention. The left-hand column gives the profile number from 1 to 14. The second column gives the number of sections in the core index profile of the example concerned. The next six columns give in µm the radii of the varying index profile of the core. The last six columns give (×1000) the index differences relative to the constant index cladding (no units). Not all the boxes of the table are filled in, as not all the profiles have the same number of sections.

FIG. 2 is a table of other properties of the profiles of an HOM dispersion-compensating optical fiber according to the invention. The boxes of the table that do not contain numbers but only a dash correspond to properties that are so bad that they make the optical fiber unusable at the wavelength concerned or in the operating spectral range concerned. The left-hand column gives the number of the profile, as already explained. The next column gives the number of sections in each profile. For each profile, the other columns give properties of the optical fiber portion corresponding to the profile concerned. The next column gives the effective area $S_{eff}$ expressed in µm² at a wavelength of 1550 nm. The next column gives the chromatic dispersion expressed in ps/nm.km at a wavelength of 1550 nm. The next seven columns give the chromatic dispersion slopes expressed in ps/nm².km at the respective wavelengths of 1530 nm, 1550 nm, 1565 nm, 1570 nm, 1580 nm, 1590 nm, and 1605 nm. The next column gives the minimum chromatic dispersion wavelength expressed in nm. The last three columns give the percentage maximum relative variations of slope over respective operating spectral ranges from 1530 nm to 1565 nm, from 1530 nm to 1580 nm, and from 1530 nm to 1605 nm. The relative variation of the dispersion slope over an operating spectral range corresponds to the quotient obtained by dividing the difference between the maximum chromatic dispersion slope over the operating spectral range by the minimum chromatic dispersion slope over the operating spectral range and the average chromatic dispersion slope over the operating spectral range. The poor results in the last column corresponding to maximum relative slope variations significantly higher than for the other columns can be explained in particular by the minimum chromatic dispersion wavelengths being too close to the upper limit of the operating spectral range concerned.

FIG. 3 shows diagrammatically one example of a first type of profile with four sections of an HOM dispersion-compensating optical fiber according to the invention. The radius expressed in µm is plotted on the abscissa axis. The index difference×1000 (no units) is plotted on the ordinate axis. The first section, called the central section, has a maximum index difference Δn1 relative to the constant index of the cladding and an outside radius r1. The maximum index difference Δn1 is positive. The index is preferably constant between a zero radius and the radius r1. The second section, called the first peripheral section, has an absolute value of the maximum index difference Δn2 relative to the constant index of the cladding and an outside radius r2. The absolute value of the maximum index difference Δn2 can be positive or negative. The index is preferably constant between the radius r1 and the radius r2. The third section, called the second peripheral section, has an absolute value of the maximum index difference Δn3 relative to the constant index of the cladding and an outside radius r3. The absolute value of the maximum index difference Δn3 can be positive or negative. The index is preferably constant between the radius r2 and the radius r3. The fourth section, called the third peripheral section, has an absolute value of the maximum index difference Δn4 relative to the constant index of the cladding and an outside radius r4. The absolute value of the maximum index difference Δn4 is positive. The index is preferably constant between the radius r3 and the radius r4. Beyond the radius r4 is the constant index cladding.

FIG. 4 shows diagrammatically the chromatic dispersion variations of the profile example represented in FIG. 3 over a wide spectral range. The curve A represents the chromatic dispersion expressed in ps/nm.km over a spectral range of wavelengths from 1450 nm to 1650 nm for an HOM dispersion-compensating optical fiber according to the invention. The example to which FIG. 4 relates is example 11 from FIGS. 1 and 2. The curve A, corresponding to a profile with four sections, has very good linearity, corresponding to a maximum relative slope variation of 13% (see FIG. 2) over an operating spectral range from 1530 nm to 1580 nm, the difference between the minimum chromatic dispersion wavelength and the upper limit of the operating spectral range being 50 nm.

FIG. 5 shows diagrammatically a second type of profile with five sections of an HOM dispersion-compensating optical fiber according to the invention. The radius expressed in µm is plotted on the abscissa axis. The index difference×1000 (no units) is plotted on the ordinate axis. The first section, called the central section, has an absolute value of the maximum index difference Δn1 relative to the constant index of the cladding and an outside radius r1. The maximum index difference Δn1 is positive. The index is preferably constant between a zero radius and the radius r1. The second section, called the first buried section, has an absolute value of the maximum index difference Δn2 relative to the constant index of the cladding and an outside radius r2. The absolute value of the maximum index difference Δn2 is negative. The index is preferably constant between the radius r1 and the radius r2. The third section, called the first annular section, has an absolute value of the maximum index difference Δn3 relative to the constant index of the cladding and an outside radius r3. The absolute value of the maximum index difference Δn3 is positive. The index is preferably constant between the radius r2 and the radius r3. The fourth section, called the second buried section, has an absolute value of the maximum index difference Δn4 relative the constant index of the cladding and an outside radius r4. The absolute value of the maximum index difference Δn4 is negative. The index is preferably constant between the radius r3 and the radius r4. The fifth section, called the second annular section, has an absolute value of the maximum index difference Δn5 relative to the constant index of the cladding and an outside radius r5. The absolute value of the maximum index difference Δn5 is positive. The index is preferably constant between the radius r4 and the radius r5. Beyond the radius r5 is the constant index cladding.

FIG. 6 shows diagrammatically the chromatic dispersion variations of the profile example represented in FIG. 5 over a wide spectral range. Curve B represents the chromatic dispersion expressed in ps/nm.km over a spectral range of wavelengths from 1450 nm to 1650 nm for an HOM dispersion-compensating optical fiber according to the invention. The example to which FIG. 5 relates is example 5 from FIGS. 1 and 2. The curve B, corresponding to a profile with five sections, has excellent linearity, corresponding to a maximum relative slope variation of 6% (see FIG. 2) over an operating spectral range from 1530 nm to 1580 nm, the difference between the minimum chromatic dispersion wavelength and the upper limit of the operating spectral range being 40 nm.

FIG. 7 shows diagrammatically a wavelength division multiplex optical fiber transmission system according to the invention. The transmission system comprises the following elements in series and in succession from the upstream end to the downstream end relative to the direction of propagation of a light signal: a line optical fiber 1 followed by a compensator module 3 which includes firstly a mode converter 2 converting most of the light energy propagating in the $LP_{01}$ fundamental mode to a higher-order mode, for example the $LP_{02}$ mode, and then an HOM dispersion-compensating optical fiber 4 according to the invention, compensating the chromatic dispersion of the line optical fiber 1 but in the $LP_{02}$ higher-order mode, then a mode converter 5 converting most of the light energy propagating in the $LP_{02}$ higher-order mode to the $LP_{01}$ fundamental mode. The transmission system according to the invention can also include other components, not shown in FIG. 7 for clarity, such as transmitters, receivers and amplifiers, and/or contain the sequence of components shown in FIG. 7 several times over.

What is claimed is:

1. A dispersion-compensating optical fiber for use in wavelength division multiplex transmission systems, said fiber comprising successively, from its center towards its periphery, a core having a varying index profile and then cladding having constant index, wherein, for a given operating spectral range greater than 30 nm, for one or more higher-order modes to propagate in addition to the $LP_{01}$ fundamental mode, the index profile of the core is structured so that, for said higher mode, and for said operating spectral range, firstly, the chromatic dispersion is less than −150 ps/nm.km, secondly, the chromatic dispersion slope is negative, thirdly, the effective area is greater than 40 $\mu m^2$, fourthly, the difference between the wavelength corresponding to the overall minimum chromatic dispersion outside said operating spectral range and the wavelength corresponding to the upper limit of said operating spectral range is greater than 35 nm, and, fifthly, the relative variation of the dispersion slope over said operating spectral range, calculated as the quotient obtained by taking the difference between the maximum chromatic dispersion slope over said operating spectral range and the minimum chromatic dispersion slope over said operating spectral range and dividing that difference by the average chromatic dispersion slope over said operating spectral range, has an absolute value less than 30%.

2. A dispersion-compensating optical fiber according to claim 1, characterized in that the index profile of the core is determined so that, for said higher mode, and for said operating spectral range, the relative variation of the dispersion slope over said operating spectral range has an absolute value less than 15%.

3. A dispersion-compensating optical fiber according to claim 1, characterized in that the index profile of the core is determined so that, for said higher mode, and for said operating spectral range, the difference between the wavelength corresponding to the overall minimum chromatic dispersion out of said operating spectral range and the wavelength corresponding to the upper limit of said operating spectral range is greater than 50 nm.

4. A dispersion-compensating optical fiber according to claim 1, characterized in that the index profile of the core is determined so that, for said higher mode, and for said operating spectral range, the chromatic dispersion is less than −300 ps/nm.km.

5. A dispersion-compensating optical fiber according to claim 1, characterized in that the higher-order mode is the $LP_{02}$ mode.

6. A dispersion-compensating optical fiber according to claim 1, characterized in that the operating spectral range is the C band from 1530 nm to 1565 nm.

7. A dispersion-compensating optical fiber according to claim 1, characterized in that the operating spectral range is the extended C band from 1530 nm to 1580 nm.

8. A dispersion-compensating optical fiber according to claim 1, characterized in that the index profile of the core has at least four sections.

9. A dispersion-compensating optical fiber according to claim 8, characterized in that the varying index profile of the core has successively, from the center toward the periphery, a central section having a maximum index higher than the index of the cladding, a first peripheral section having a maximum index lower than the index of the central section, a second peripheral section having a maximum index lower than the index of the central section, and a third peripheral section having a maximum index lower than the index of the central section.

10. A dispersion-compensating optical fiber according to claim 9, characterized in that the absolute value of the maximum index difference (Δn1) between the index of the central section and the index of the cladding is from $20\times10^{-3}$ to $35\times10^{-3}$ and the outside radius (r1) of the central section is from 3 $\mu$m to 5 $\mu$m.

11. A dispersion-compensating optical fiber according to claim 9, characterized in that the absolute value of the maximum index difference (|Δn2|) between the index of the first peripheral section and the index of the cladding remains less than $5\times10^{-3}$ and the outside radius (r2) of the first peripheral section is from 6 $\mu$m to 11 $\mu$m.

12. A dispersion-compensating optical fiber according to claim 9, characterized in that the absolute value of the index difference (|Δn3|) between the index of the second peripheral section and the index of the cladding remains less than $5\times10^{-3}$ and the outside radius (r3) of the second peripheral section is from 8 $\mu$m to 15 $\mu$m.

13. A dispersion-compensating optical fiber according to claim 9, characterized in that the index difference (|Δn4|) between the index of the third peripheral section and the index of the cladding remains from 0 to $8\times10^{-3}$ and the outside radius (r4) of the third peripheral section is from 10 $\mu$m to 17 $\mu$m.

14. A dispersion-compensating optical fiber according to claim 1, characterized in that the index profile of the core has at least five sections.

15. A dispersion-compensating optical fiber according to claim 14, characterized in that the varying index profile of the core has successively, from the center toward the periphery, a central section having a maximum index higher than the index of the cladding, a first buried section having a minimum index lower than the index of the cladding, a second annular section having a maximum index higher than the index of the cladding and lower than the maximum index of the central section, a second buried section having a minimum index lower than the index of the cladding, and a second annular section having a maximum index higher than the index of the cladding and lower than the maximum index of the central section.

16. A dispersion-compensating optical fiber according to claim 15, characterized in that the absolute value of the maximum index difference ($\Delta n1$) between the index of the central section and the index of the cladding is from $23\times10^{-3}$ to $35\times10^{-3}$ and the outside radius (r1) of the central section is from 3 $\mu$m to 4.5 $\mu$m.

17. A dispersion-compensating optical fiber according to claim 15, characterized in that the index difference ($\Delta n2$) between the index of the first buried section and the index of the cladding remains from $-8\times10^{-3}$ to 0 and the outside radius (r2) of the first buried section is from 4.5 $\mu$m to 7.5 $\mu$m.

18. A dispersion-compensating optical fiber according to claim 15, characterized in that the index difference ($\Delta n3$) between the index of the first annular section and the index of the cladding remains from $2\times10^{-3}$ to $8\times10^{-3}$ and the outside radius (r3) of the first annular section is from 6 $\mu$m to 11 $\mu$m.

19. A dispersion-compensating optical fiber according to claim 15, characterized in that the index difference ($\Delta n4$) between the index of the second buried section and the index of the cladding is from $-8\times10^{-3}$ to 0 and the outside radius (r4) of the second buried section is from 10 $\mu$m to 15 $\mu$m.

20. A dispersion-compensating optical fiber according to claim 15, characterized in that the index difference ($\Delta n5$) between the index of the second annular section and the index of the cladding remains from 0 to $10\times10^{-3}$ and the outside radius (r5) of the second annular section is from 13 $\mu$m to 17 $\mu$m.

21. A dispersion-compensating optical fiber according to claim 1, characterized in that said dispersion-compensating optical fiber has an attenuation lower than 1.5 dB/km at a wavelength of 1550 nm.

22. A chromatic dispersion-compensating module, characterized in that said module (3) includes a dispersion-compensating optical fiber (4) according to claim 1.

23. A chromatic dispersion-compensating module according claim 22, characterized in that said module (3) comprises successively in series a first mode converter (2) capable of converting the fundamental mode into the higher-order mode, said dispersion-compensating optical fiber (4), and a second mode converter (5) capable of converting the higher-order mode into the fundamental mode.

24. A wavelength division multiplex optical fiber transmission system, characterized in that said system comprises successively in series a line optical fiber (1) and a compensating module (3) according to claim 22.

25. A wavelength division multiplex optical fiber transmission system according to claim 24, characterized in that the ratio between the length of the line optical fiber (1) and the length of the dispersion-compensating optical fiber (4) is substantially equal to the reciprocal of the absolute value of the ratio between the chromatic dispersion of the line optical fiber (1) at a wavelength of 1550 nm and the chromatic dispersion of the dispersion-compensating optical fiber (4) at a wavelength of 1550 nm.

26. A wavelength division multiplex optical fiber transmission system according to claim 24, characterized in that the absolute value of the average cumulative chromatic dispersion for each wavelength from 1530 nm to 1565 nm is less than 30 ps/nm for a transmission distance of 100 km.

27. A wavelength division multiplex optical fiber transmission system according to claim 24, characterized in that the absolute value of the average cumulative chromatic dispersion for each wavelength from 1530 nm to 1580 nm is less than 50 ps/nm for a transmission distance of 100 km.

* * * * *